(12) United States Patent
Rice et al.

(10) Patent No.: US 7,065,110 B2
(45) Date of Patent: Jun. 20, 2006

(54) SCALABLE WAVELENGTH SHIFTED LASER SOURCE AND METHOD

(75) Inventors: Robert R. Rice, Simi Valley, CA (US); Michael G. Wickham, Rancho Palos Verdes, CA (US); Eric C. T. Cheung, Torrance, CA (US); Hiroshi Komine, Torrance, CA (US); Joshua E. Rothenberg, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 276 days.

(21) Appl. No.: 10/761,723

(22) Filed: Jan. 20, 2004

(65) Prior Publication Data

US 2005/0157760 A1    Jul. 21, 2005

(51) Int. Cl.
*H01S 3/10* (2006.01)

(52) U.S. Cl. ............................. 372/21; 372/6
(58) Field of Classification Search ............... 372/21, 372/6; 359/326, 330, 331
See application file for complete search history.

(56) References Cited

U.S. PATENT DOCUMENTS

| | | | |
|---|---|---|---|
| 4,897,562 A * | 1/1990 | Krasinski et al. ............ 359/330 |
| 4,907,238 A * | 3/1990 | Chun et al. .................... 372/32 |
| 5,694,408 A | 12/1997 | Bott et al. ....................... 372/6 |
| 5,832,006 A | 11/1998 | Rice .............................. 372/3 |
| 6,061,170 A * | 5/2000 | Rice et al. .................... 359/345 |
| 6,147,755 A | 11/2000 | Heflinger et al. ............. 356/349 |
| 6,229,616 B1 | 5/2001 | Brosnan et al. .............. 356/484 |
| 6,243,168 B1 | 6/2001 | Heflinger et al. ............ 356/486 |
| 6,301,273 B1 * | 10/2001 | Sanders et al. ................. 372/6 |
| 6,366,356 B1 * | 4/2002 | Brosnan et al. .............. 356/477 |

* cited by examiner

*Primary Examiner*—Minsun Harvey
*Assistant Examiner*—Tod T. Van Roy
(74) *Attorney, Agent, or Firm*—Carmen B. Patti & Assoc.

(57) ABSTRACT

A laser array architecture scalable to very high powers by fiber amplifiers, but in which the output wavelength is selectable, and not restricted by the wavelengths usually inherent in the choice of fiber materials. A pump beam at a first frequency is amplified in the fiber amplifier array and is mixed with a secondary beam at a second frequency to yield a frequency difference signal from each of an array of optical parametric amplifiers. A phase detection and correction system maintains the array of outputs from the amplifiers in phase coherency, resulting in a high power output at the desired wavelength. A degenerate form of the architecture is disclosed in an alternate embodiment, and a third embodiment employs dual wavelength fiber amplifiers to obtain an output at a desired difference frequency.

19 Claims, 3 Drawing Sheets

SCALABLE WAVELENGTH SHIFTED LASER SOURCE AND METHOD

BACKGROUND OF THE INVENTION

This invention relates generally to high power laser sources and, more particularly, to midwave infrared (MWIR) high power laser sources. These laser sources are needed for a variety of applications, both military and commercial, but output power is significantly limited with current MWIR technology. Midwave infrared radiation is typically defined as having a wavelength between 2.5 to 6 µm. Near infrared (NIR) radiation has a wavelength between visible red and the midwave IR range, i.e., about 0.7 to 2.5 µm.

Phased arrays of high power fiber amplifiers have been demonstrated or proposed but have significant drawbacks. In a typical prior art approach, output from a master oscillator (MO) is distributed to an array of high power fiber amplifiers pumped by laser diode arrays. The output beams from the fiber amplifiers are combined in a closely packed lens array to form the output beam. A sample of each output beam is compared on a detector array, to a frequency shifted reference wavefront derived from the MO, to provide a measurement of the instantaneous phase of each fiber amplifier in the array, and the phases are then corrected in real time to form the output beam. The output from the MO defines the spectrum and modulation waveform input to the amplifiers. A critical limitation is that the wavelength of operation is restricted by the gain bandwidth of the rare earth dopant used in the core of the fiber amplifiers. For the most efficient designs this wavelength happens to fall in the region of 1000 nm to 1100 nm using ytterbium (Yb) as the dopant. Unfortunately, this is a spectral region in which the eye is quite vulnerable to permanent damage. While fiber laser arrays can be constructed at longer eyesafe wavelengths (e.g., beyond 1500 nm) using erbium-ytterbium (ErYb), Thulium (Tm), holmium (Ho), and other materials, the efficiency and wavelength coverage are not optimum. If factors relating to eye safety force the selection of a wavelength longer than 1500 nm for a laser weapon system or high power illuminator, for example, performance can be significantly compromised unless potentially efficient and scalable architectures can be developed.

The basic architecture of which the present invention is an improvement, is described in various prior patents, notably U.S. Pat. No. 5,694,408 to Bott et al., "Fiber Optic Laser System and Associated Lasing Method." The present invention also utilizes a prior art technique for beam formation and phase control, as described in four other patents: U.S. Pat. No. 6,147,755 to Heflinger et al., "Dynamic Optical Phase State Detector," U.S. Pat. No. 6,229,616 to Brosnan et al., "Heterodyne Wavefront Sensor," U.S. Pat. No. 6,243,168 to Heflinger et al., "Dynamic Optical Micrometer," and U.S. Pat. No. 6,366,356 to Brosnan et al., "High Average Power Fiber Laser System with High-Speed, Parallel Wavefront Sensor." To the extent needed to provide a complete disclosure, these patents are incorporated by reference into this document.

It will be appreciated from the foregoing, that there is a need for a laser source that is both scalable to high powers and operable at a selected wavelength that is not restricted by the properties of dopants used in fiber amplifiers. The present invention satisfies this need and provides other advantages over the prior art.

SUMMARY OF THE INVENTION

The present invention resides in a scalable high power laser source of which the output wavelength can be shifted to a desired region, such as an eyesafe wavelength region beyond 1500 nm or a desired region that facilitates transmission through the atmosphere. Briefly, and in general terms, the invention defined in terms of a laser architecture comprises an array of laser fiber amplifiers; a master oscillator generating a pump beam at a first frequency; means for coupling the pump beam into each of the laser fiber amplifiers; means for generating a secondary beam at a second frequency; an array of optical parametric amplifiers; means for coupling amplified pump beams from the laser fiber amplifiers into respective optical parametric amplifiers; and means for coupling the secondary beam into each of the optical parametric amplifiers. The optical parametric amplifiers generate an array of high power output sub-beams having a signal frequency that is the difference between first and second frequencies. The architecture further comprises means for detecting phase differences in the output sub-beams and a plurality of phase modulators for adjusting the phases of the parametric amplifier input beams in response to the detected phase differences. Thus, the output sub-beams have phase coherency and the architecture is readily scalable to higher powers by increasing the numbers of arrayed fiber amplifiers and optical parametric amplifiers. Significantly, the frequency of the secondary beam can be selected to provide a desired output signal frequency that is not restricted by the frequency typically dictated by choice of fiber core materials.

In one important embodiment of this architecture, the pump frequency is exactly twice the secondary frequency and the architecture operates in a degenerate mode that provides efficiency advantages. In another embodiment, the pump and secondary frequencies are selected to be within the gain bandwidths of a dual-wavelength fiber amplifier, providing a high power output signal in an important bandwidth range for which there are no good alternative sources.

In terms of a novel method for generating a high power optical output at a desired wavelength, the invention comprises the steps of generating, in a master oscillator, a pump beam at a first frequency; coupling the pump beam to each element of an array of fiber amplifiers; generating a secondary beam at a second frequency; coupling the amplified pump beam from the array of fiber amplifiers into corresponding elements of an array of optical parametric amplifiers; coupling the secondary beam into each element of the array of optical parametric amplifiers; and generating in each element of the array of optical parametric amplifiers a frequency difference signal having a frequency that is the difference between the first and second frequencies, to provide an array of output sub-beams. The method further comprises the steps of detecting phase differences in the output sub-beams and adjusting the phases of the parametric amplifier input beams in response to the detected phase differences. The second frequency is selected to provide a desired output signal frequency.

One variant of the basic method of the invention provides for operation in a degenerate mode in which the pump frequency is exactly double the secondary signal frequency, providing significant efficiency advantages for an important range of output wavelengths. In another variant of the basic method, the first and second frequencies are selected to fall within dual gain bandwidths associated with a dual dopant fiber core material, providing output in a desired range of bandwidths.

It will be appreciated that the apparatus and method of the present invention provide for wavelength shifting of a laser output beam that is readily scalable to higher powers because the sub-beams are individually phase controlled for coherency. Thus the architecture of the invention generates a scalable high power beam at a desired wavelength that is not limited by fiber core materials used in the fiber amplifiers. Other aspects and advantages of the invention will become apparent from the following more detailed description, taken in conjunction with the accompanying drawings.

DETAILED DESCRIPTION OF THE INVENTION

Figure 1:
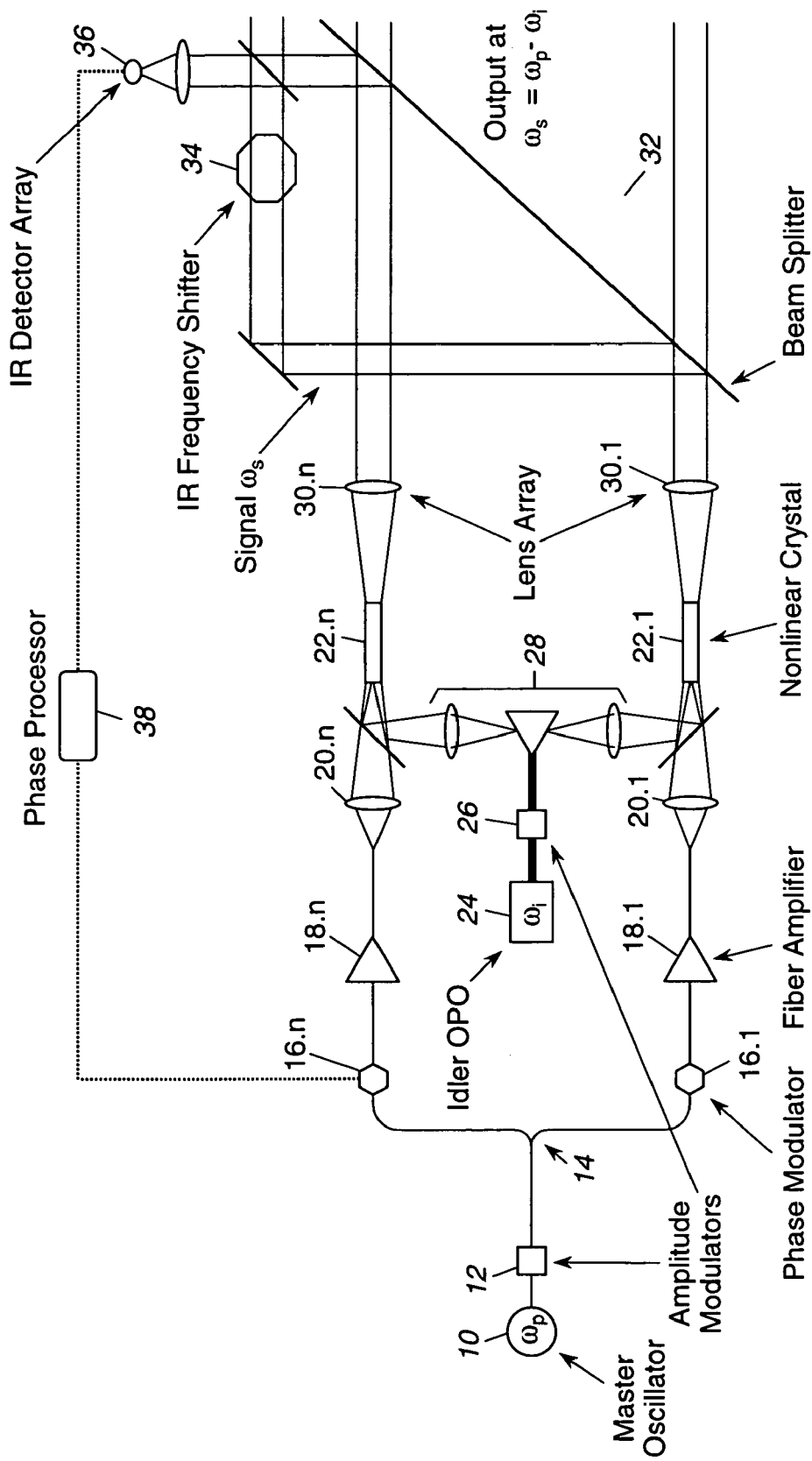
FIG. 1 is a schematic view of a scalable midwave infrared (MWIR) laser array architecture in accordance with the invention.

As shown in the drawings for purposes of illustration, the present invention is concerned with a laser source architecture that is both scalable to high powers and is wavelength selectable, independent of the constraints normally imposed by properties of rare earth elements used in fiber amplifiers. In the past, arrays of fiber amplifiers have produced outputs that, although scalable to higher powers, have been restricted in wavelength by the gain bandwidth inherently associated with the fiber core materials. For most efficient designs, this gain bandwidth falls in the region 1000 nm to 1100 nm, which is unfortunately not a desirable wavelength range from the standpoint of eye safety.

In accordance with the invention, an array architecture is configured to provide output at a desired wavelength that is not restricted by the fiber amplifier gain bandwidth. The output is easily scalable to high powers without adversely affecting the efficiency of the device or the beam quality.

FIG. 1 shows the scalable array architecture for a midwave infrared (MWIR) laser source in accordance with the present invention. The architecture includes a single master oscillator (MO), indicated by reference numeral 10, and an associated optional amplitude modulator 12, providing a pump radiation source at a frequency $\omega_p$. The pump beam is split along multiple paths, as indicated diagrammatically at 14, only two of which are shown. The pump beam in each path is processed by phase modulator (16.1 through 16.n) and then input to one member of a fiber amplifier array (18.1 through 18.n). The phase adjusted amplified pump beams are focused by appropriate lenses (20.1 through 20.n) into an array of nonlinear crystals (22.1 through 22.n), which are conventional optical parametric amplifier (OPA) devices and which perform frequency difference generation. Also input to each of the crystals 22 is a second beam at frequency $\omega_i$, referred to as an 'idler'. The idler is generated in an optical parametric oscillator (OPO) 24, processed by an optional amplitude modulator 26, and then split into n paths as indicated by the combination 28 of optical elements that provide n idler beams at frequency $\omega_i$, each of which is input into one of the crystals (22.1 through 22.n).

The array of crystals (22.1 through 22.n) produces an array of n output beams at the difference frequency $\omega_s$, usually referred to as the 'signal', where $\omega_s = \omega_p - \omega_i$. Each of the output signal beams is collimated by a lens (30.1 through 30.n) and sampled by a beam splitter 32. The output from the first beam, or any selected beam, is used as a reference. This output is processed by an infrared (IR) frequency shifter 34, in which the phase of the output signal is dithered by a radio-frequency (RF) signal. The output of the frequency shifted signal is then focused onto an IR detector array 36. The output of the $n^{th}$ beam is focused onto one element of the detector array and interfered with the frequency shifted signal. The resultant signals from the detector array are used in a phase processor 38 to generate phase control signals that are applied to the phase modulators 16.1 through 16.n. In effect, first output beam is used as a reference beam and each of the other output beams (2 through n) is interfered with the frequency-shifted reference beam to generate a phase control signal that has the effect of rendering the output beam array coherent.

Each OPA device is fabricated using a nonlinear crystal such as periodically poled lithium niobate (PPLN), potassium titanyl phosphate (KTP), lithium tantalate (LT), or other poled or non-poled materials. Periodic poling allows phase matching to be achieved for nearly any combination of pump, idler and signal frequencies in this spectral region, and greatly reduces the angular sensitivity of phase matching. In FIG. 1, the idler is injected into the nonlinear device, thereby determining the signal frequency $\omega_s$ through the conservation of energy relationship mentioned above. The phase of the amplified idler is coherent with respect to the injected idler. There is no attempt made to coherently phase the output idler frequency, though it can be readily done by addition of a second wavefront control loop to form a coherent beam at a second wavelength, for dual wavelength applications. For example, an idler wavelength beam might contribute to weapons effects or be used as a beacon. Here it is merely ignored or dumped. The phase of the signal frequency is now coherent with that of the pump and injected idler by reason of the nonlinear process itself. This coherence property is used to enable control of the output signal beam phases at $\omega_s$ and formation of the output signal beam. An optional amplitude modulator may be incorporated into one or both injected beams to enhance the peak power for a given average power input. This may be desirable to increase the efficiency of the nonlinear mixing process.

There is a requirement that the PPLN or other crystal device be transparent at the pump, idler and signal frequencies to enable efficient conversion and avoid excessive heat dissipation in the crystal. Since transmission tends to drop in the range of about 3500–4500 nm in single crystal oxides such as LN, LT and KTP, the useful range of signal and idler wavelengths when using a 1030–1100 nm pump tends to be between about 1500 nm and 4000 nm for PPLN and slightly wider for PPLT. This band covers many very important wavelength regions that have high military and civilian uses. For use as a directed energy (DE) source, atmospheric transmission is especially critical because of thermal blooming effects. Hence, only those very clear transmission windows are attractive for laser weapon applications. Of course, atmospheric attenuation is an undesirable effect for virtually any application, so it is important to be able to tune the wavelength to those "micro-windows" that abound even in undesirable regions of the NIR and MWIR spectrum. Wavelength flexibility also allows the wavelength to be tuned on and off an absorption feature due to a specific agent or pollutant, such as Sarin, for remote sensing (e.g., Differential Absorption Lidar DIAL) applications.

To recap, the laser source architecture of FIG. 1 is easily scalable to very high powers by including large numbers of elements in the arrays of amplifiers 16, crystals 22 and associated optical elements. Output beam coherence is maintained by interfering a selected reference beam with every other beam and continuously adjusting the phases of the pump beams to compensate for any detected discrepancy. The output frequency or wavelength is selected by selecting an appropriate frequency $\omega_i$ for the idler, to provide an output signal wavelength that is in the eyesafe range and/or corresponds to a window of high atmospheric transmission.

Figure 2:
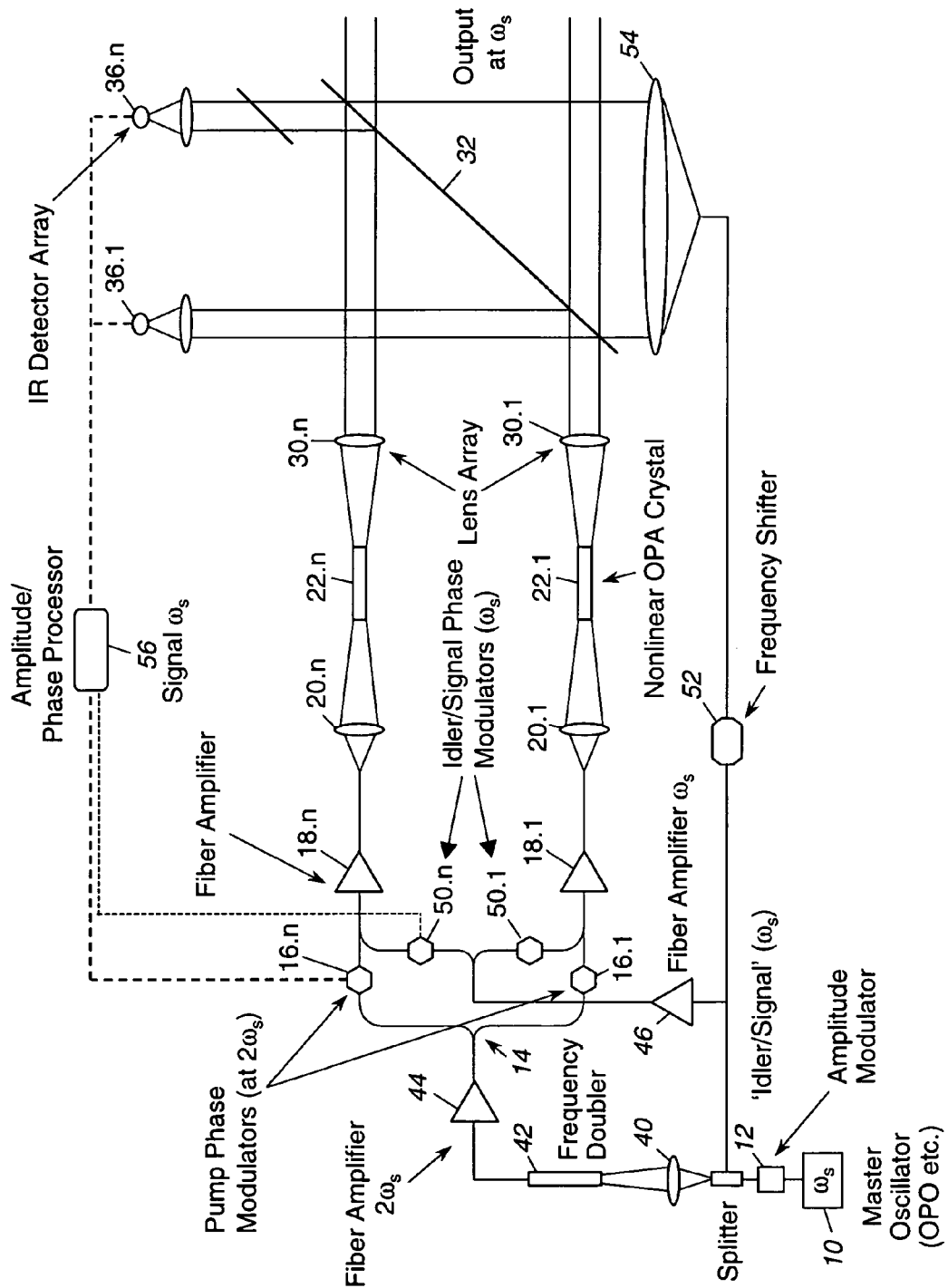
FIG. 2 is a view similar to FIG. 1, but depicting a special degenerate case.

FIG. 2 shows the special case of a degenerate optical parametric amplifier, in which the pump signal frequency is exactly double the desired output signal frequency. In this configuration, the pump beam and the second input beam (referred to as an idler in FIG. 1. However, in the degenerate case the signal and idler are at identical frequencies) are both derived from the common master oscillator 10 operating at a frequency $\omega_s$. The master oscillator signal is coupled by a lens 40 to a frequency doubler 42, the output of which is amplified by a fiber amplifier 44. The amplified pump beam, at a frequency $2\omega_s$, is split into multiple (n) beams by the splitter 14, each of which passes through one member of an array of pump phase modulators (16.1 through 16.n) before coupling to a corresponding one of the array of fiber amplifiers (18.1 through 18.b). The master oscillator signal beam at frequency $\omega_s$ is also coupled to a separate fiber amplifier 46, the output of which is split into n signal beams by a splitter 48. The separate outputs of the splitter 48 are coupled to additional idler phase modulators (50.1 through 50.n). The outputs of these phase modulators are combined with the corresponding outputs of phase modulators 16.1 through 16.n, and the combined pairs of these beams are input to the fiber amplifiers (18.1 through 18.n).

As in the configuration of FIG. 1, the outputs of the fiber amplifiers (18.1 through 18.n) of FIG. 2 are focused by lenses (20.1 through 20.n) into crystals (22.1 through 22.n), which function as optical parametric amplifiers and perform a frequency differencing function. Thus the outputs of the crystals are signal beams at the difference frequency $2\omega_s - \omega_s = \omega_s$. These output sub-beams are focused into a coherent output beam by the lens array (30.1 through 30.n).

Phase coherence is effected by a slightly different approach in the FIG. 2 configuration. In FIG. 1, one of the output sub-beams was used as a reference against which to measure phase differences in the other sub-beams. In the FIG. 2 configuration, a reference at the desired output frequency $\omega_s$ is readily available from the master oscillator 10. Accordingly, a reference beam is tapped from the master oscillator 10 and coupled to a frequency shifter 52, which is functionally equivalent to the frequency shifter 34 in FIG. 1. The output of the frequency shifter 52 is focused by a lens 54 onto the IR detector array 36, where the reference signal is interfered with each of the sub-beams output from the lens array 30. The resulting detected phase differences, as processed by processor 56, provide control signals to the phase modulators (16.1 through 16.n and 50.1 through 50.n).

The degenerate configuration, although limited in terms of wavelength selectivity, provides highly efficient energy conversion because there is no discarded idler, the energy of which is essentially wasted in the FIG. 1 configuration. In the degenerate case, one photon at the pump frequency $2\omega_s$ is converted into two photons at frequency $\omega_s$. The phase of these two wavelengths must be separately controlled for proper operation. The average phase of the pump and subharmonic signal is controlled to form the output beam and the relative phase of the pump and subharmonic is adjusted simultaneously to maintain the proper phase relationship between the pump and subharmonic to achieve maximum conversion efficiency. Thus, the detector array 36 also provides an amplitude signal, which the processor 56 uses to optimize the efficiency of each ($n^{th}$) parametric amplifier, by adjusting the phase difference between the appropriate pump modulator (16.n) and idler modulator (50.n). Again one can optionally incorporate the amplitude modulator 12 in front of the master oscillator 10 to increase the peak power of the two input beams. The subharmonic of ytterbium (Yb) fiber lasers, for example, can be tuned from 2120 nm to 2200 nm, a region containing some of the lowest transmission losses in the 2 µm band. For directed energy and high power ladar illuminator applications, this is an ideal situation, one in which thermal blooming and transmission loss would likely be very minimal. Additionally, the effects of atmospheric turbulence are substantially lower at this wavelength than at a 1 µm pump wavelength. Therefore, it will be appreciated that the degenerate configuration provides very high power output and high efficiency, in a wavelength region that is extremely useful for certain applications.

Figure 3:
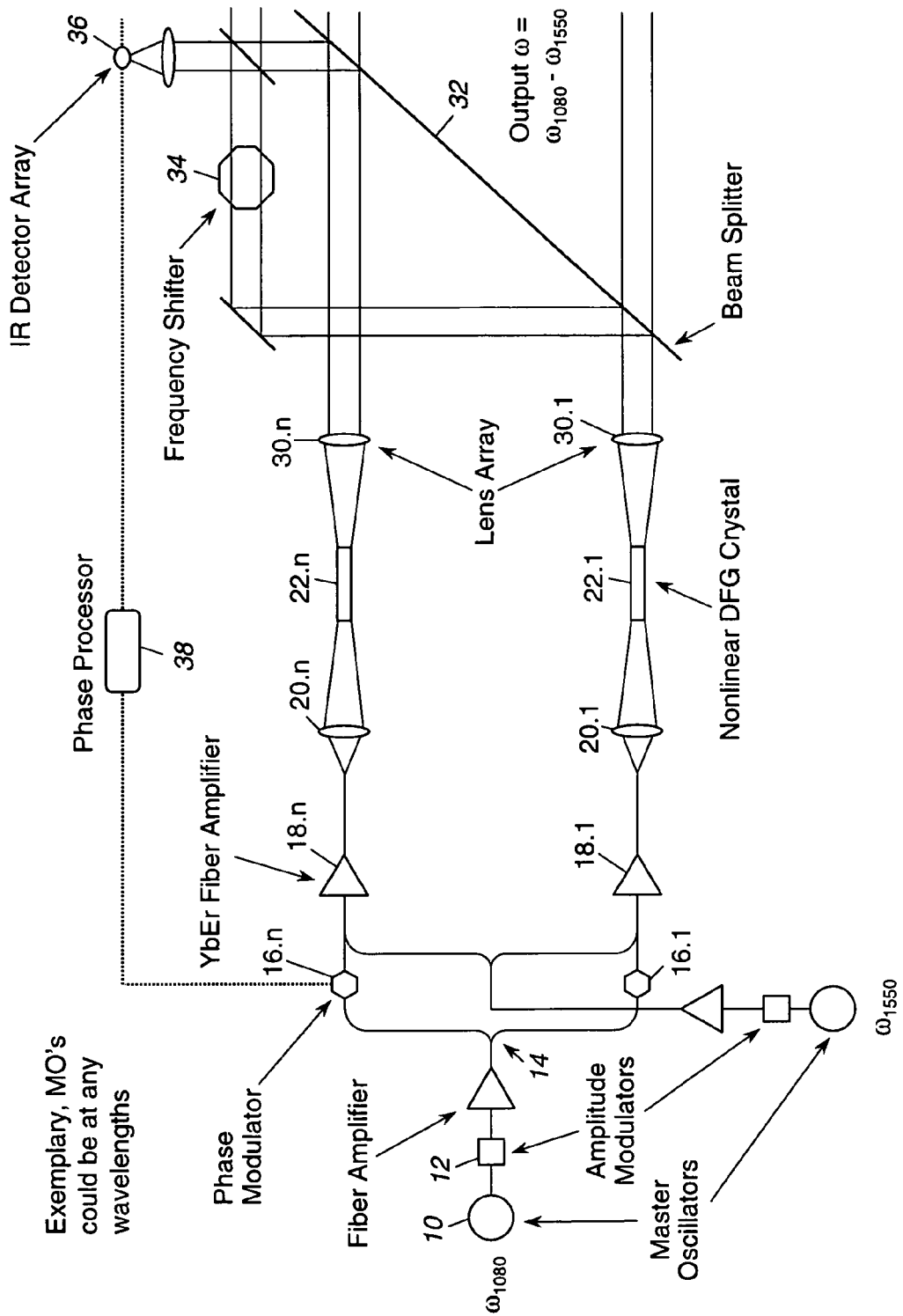
FIG. 3 is a view similar to FIG. 1, but incorporating dual wavelength laser amplifiers to obtain a desired frequency difference signal.

FIG. 3 depicts another embodiment of the invention, which also has certain features in common with the FIG. 1 embodiment. Therefore, the same reference numerals have been used to refer to the same or nearly identical components. In this embodiment, the fiber amplifiers (18.1 through 18.n) are dual doped fiber amplifiers, including as dopants both ytterbium (Yb) and erbium (Er). It has been shown that YbEr fibers can be operated at both the 1 µm band and the 1.5 µm band simultaneously by adjusting the amount of input signal power at each wavelength. (See, for example U.S. Pat. No. 6,061,170.) If a signal within the band from roughly 1060 nm to 1100 nm is injected along with another signal in the band from roughly 1530 nm to 1600 nm, the two injected signals can mix in a nonlinear crystal and produce a difference frequency, and the two longer wavelengths are parametrically amplified. By tuning the input signals in the 1 µm and 1.5 µm bands within these ranges, the output signal at the difference frequency can be tuned to provide a wavelength range from about 3050 nm to 3950 nm. Although this configuration incurs an efficiency penalty, it nevertheless provides an output scalable to higher powers, and at an important wavelength range for which no good alternate sources are available.

As shown in FIG. 3, a first input beam with a wavelength of 1080 nm is generated by the master oscillator 10, modulated by optional amplitude modulator 12 and pre-amplified by a fiber amplifier 13. The amplified beam is split as indicated at 14, processed by phase modulators (16.1 through 16.n) and input to the fiber amplifier array (18.1 through 18.n). Similarly, a second master oscillator 10, amplitude modulator 12, fiber amplifier 13 and splitter 14, provide the second input beams to the fiber amplifier array (18.1 through 18.n). The remaining elements of FIG. 3 are similar to corresponding features of FIG. 1.

The dual wavelength fiber configuration may also operated to produce an output based on the sum frequency of the injected beams. In the case of a dual wavelength fiber array operating in the 1 µm and 1.5 µm bands, a sum frequency can be generated having a wavelength in the range of about 630 nm to 660 nm.

It will be appreciated from the foregoing that the present invention represents a significant advance in the field of high power lasers, providing an output beam that is readily scalable to higher powers and has a wavelength that is selectable without being limited by the properties of the fiber amplifier core materials. It will also be appreciated that, although the invention has been described with reference to specific embodiments, various modifications may be made without departing from the spirit and scope of the invention. Accordingly, the invention should not be limited except as by the appended claims.

The invention claimed is:

1. A laser array architecture, comprising:
   an array of laser fiber amplifiers;
   a master oscillator generating a pump beam at a frequency $\omega_1$;
   means for coupling the pump beam into each of the laser fiber amplifiers;
   means for generating a secondary beam at a frequency $\omega_2$;
   an array of optical parametric amplifiers;
   means for coupling amplified pump beams from the laser fiber amplifiers into respective optical parametric amplifiers;
   means for coupling the secondary beam into each of the optical parametric amplifiers, wherein the optical parametric amplifiers generate an array of high power output sub-beams having a signal frequency $\omega_s$ that is the difference between frequencies $\omega_1$ and $\omega_2$;
   means for detecting phase differences in the output sub-beams; and
   a plurality of phase modulators for adjusting the phases of the laser amplifier input beams in response to the detected phase differences, resulting in phase coherency among the output sub-beams;
   wherein the frequency $\omega_2$ is selected to provide a desired output signal frequency $\omega_s$.

2. A laser array architecture as defined in claim 1, wherein:
   the optical parametric amplifiers are nonlinear crystals.

3. A laser array architecture as defined in claim 1, wherein:
   the means for generating the secondary beam includes a second master oscillator operating at frequency $\omega_2$; and
   the plurality of phase modulators are connected to control the phases of the pump beams input to the laser fiber amplifiers.

4. A laser array architecture as defined in claim 1, wherein the means for detecting phase differences comprises:
   optical splitting means for obtaining a sample of each of the output sub-beams;
   a frequency shifting device connected to vary the frequency of a selected one of the output sub-beam samples; and
   a multi-element detector array, each element of which records the result of interfering one of the sub-beam samples with the selected frequency-shifted sample, and generates a phase difference signal;
   wherein the selected output sub-beam is used as phase reference and the other sub-beams are adjusted to be phase coherent with the selected sub-beam.

5. A laser array architecture as defined in claim 1, wherein:
   the master oscillator generates an output at a frequency $\omega_s$;
   the architecture further comprises a frequency doubler coupled to the master oscillator, for generating an output pump beam at a frequency $2\omega_s$;
   the secondary beam is derived from the master oscillator at a frequency $\omega_s$;
   each of the output sub-beams has a difference frequency of $2\omega_s - \omega_s = \omega_s$ and the optical parametric amplifiers operate in a degenerate mode; and
   the plurality of phase modulators include a first plurality of phase modulators connected in the pump beam inputs to the laser amplifiers and a second plurality of phase modulators connected in the secondary inputs to the laser amplifiers.

6. A laser amplifier architecture as defined in claim 5, wherein:
   the means for coupling the pump beam to each of the laser fiber amplifiers includes common amplifier and an optical splitter.

7. A laser amplifier architecture a defined in claim 6, wherein:
   the means for coupling the secondary beam into the optical parametric amplifiers includes a common amplifier and an optical splitter, wherein the pump beams and the secondary beams are both input to the respective laser fiber amplifiers.

8. A laser amplifier architecture as defined in claim 5, wherein the means for detecting phase differences in the output sub-beams comprises:
   optical splitting means for obtaining a sample of each of the output sub-beams;
   means for splitting off a reference beam from master oscillator beam;
   a frequency shifting device connected to vary the frequency of the reference beam; and
   a multi-element detector array, each element of which records the result of interfering one of the sub-beam samples with the frequency-shifted reference beam, and generates a phase difference signal;
   wherein the sub-beams are adjusted to be phase coherent with the reference beam.

9. A laser amplifier architecture as defined in claim 1, wherein:
   the laser fiber amplifiers have dual doped fiber cores that permit operation in two gain bandwidth ranges simultaneously; and
   the frequencies $\omega_1$ and $\omega_2$ are selected to fall within the two respective gain bandwidths of the fibers.

10. A laser amplifier architecture as defined in claim 9, wherein:
    the cores of the laser fiber amplifiers include ytterbium (Yb) and erbium (Er) as dopants;
    the frequencies $\omega_1$ and $\omega_2$ correspond to wavelengths of approximately 1 μm and 1.5 μm, respectively; and
    the outputs of the architecture have a difference frequency of $\omega_1 - \omega_2$ corresponding to a wavelength between 3 μm and 4 μm.

11. A method for generating, from an array of laser fiber amplifiers, a high power coherent output beam at a desired wavelength the method comprising the steps of:
    generating in a master oscillator a pump beam at a frequency $\omega_1$;
    coupling the pump beam to each of element of the array of fiber amplifiers;
    generating a secondary beam at a frequency $\omega_2$;
    coupling the amplified pump beam from the array of fiber amplifiers into corresponding elements of an array of optical parametric amplifiers;
    coupling the secondary beam into each element of the array of optical parametric amplifiers;
    generating in each element of the array of optical parametric amplifiers a frequency difference beam having a frequency $\omega_s$ that is the difference between the frequencies $\omega_1$ and $\omega_2$, to provide an array of output sub-beams;

detecting phase differences in the output sub-beams; and adjusting the phases of the laser amplifier input beams in response to the detected phase differences;

wherein the frequency $\omega_2$ is selected to provide a desired output signal frequency $\omega_s$.

12. A method as defined in claim 11, wherein:

the step of generating the secondary beam is performed in a second master oscillator operating at frequency $\omega_2$; and the step of adjusting phases is effected by phase modulators connected to control the phases of the pump beams input to the laser fiber amplifiers.

13. A method as defined in claim 11, wherein the step of detecting phase differences comprises:

splitting off a sample of each of the output sub-beams;

frequency shifting a selected one of the output sub-beam samples; and interfering each one of the sub-beam samples with the selected frequency-shifted sample in a detector array, to generate a phase difference signal;

wherein the selected output sub-beam is used as phase reference and the other sub-beams are adjusted to be phase coherent with the selected sub-beam.

14. A method as defined in claim 11, wherein:

the master oscillator for generating the pump beam provides an output at a frequency $\omega_s$;

the method further comprises the step of doubling the master oscillator output, to provide a pump beam at a frequency $2\omega_s$;

the step of generating the secondary beam includes deriving the secondary beam from the master oscillator at a frequency $w_s$;

each of the output sub-beams has a difference frequency of $2\omega_s - \omega_s = \omega_s$ and the optical parametric amplifiers operate in a degenerate mode; and the step of adjusting phases is effected by a first plurality of phase modulators connected in the pump beam inputs to the laser amplifiers and a second plurality of phase modulators connected in the secondary inputs to the laser amplifiers.

15. A method as defined in claim 14, wherein:

the step of coupling the pump beam to each of the laser fiber amplifiers includes amplifying the pump beam in a common amplifier and splitting the amplified pump beam in an optical splitter.

16. A method as defined in claim 15, wherein:

the step of coupling the secondary beam into the optical parametric amplifiers includes amplifying the secondary beam in a common amplifier and splitting the amplified secondary beam in an optical splitter, wherein the pump beams and the secondary beams are both input to the respective laser fiber amplifiers.

17. A method as defined in claim 14, wherein the step of detecting phase differences in the output sub-beams comprises:

splitting off a sample of each of the output sub-beams;

splitting off a reference beam from master oscillator beam;

varying the frequency of the reference beam; and interfering each of the sub-beam samples with the frequency-shifted reference beam, in a multi-element detector array, each element of which records detects a phase difference and generates a phase difference signal;

wherein the sub-beams are adjusted to be phase coherent with the reference beam.

18. A method as defined in claim 11, wherein the method further comprises:

selecting the laser fiber amplifiers to have dual doped fiber cores that permit operation in two gain bandwidth ranges simultaneously; and selecting the frequencies $\omega_1$ and $\omega_2$ to fall within the two respective gain bandwidths of the fibers.

19. A method as defined as defined in claim 18, wherein:

the step of selecting the laser fiber amplifiers selects fibers with cores that include ytterbium (Yb) and erbium (Er) as dopants;

the step of selecting the frequencies provides that frequencies $\omega_1$ and $\omega_2$ correspond to wavelengths of approximately 1 μm and 1.5 μm, respectively; and the sub-beams provide outputs at a difference frequency of $(\omega_1 - \omega_2)$, corresponding to a wavelength between 3 μm and 4 μm.

* * * * *